United States Patent
Luo et al.

(10) Patent No.: US 10,432,270 B2
(45) Date of Patent: Oct. 1, 2019

(54) SPATIAL SCALABLE VIDEO MULTICAST FOR HETEROGENEOUS MIMO SYSTEMS

(71) Applicant: MICROSOFT TECHNOLOGY LICENSING, LLC, Redmond, WA (US)

(72) Inventors: Chong Luo, Beijing (CN); Hao Cui, Beijing (CN); Chang Wen Chen, East Amherst, NY (US); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1213 days.

(21) Appl. No.: 14/076,943

(22) Filed: Nov. 11, 2013

(65) Prior Publication Data

US 2015/0131720 A1  May 14, 2015

(51) Int. Cl.
*H04B 7/0413* (2017.01)
*H04L 12/18* (2006.01)
*H04N 19/30* (2014.01)
*H04N 19/59* (2014.01)
*H04B 7/06* (2006.01)

(52) U.S. Cl.
CPC ......... *H04B 7/0413* (2013.01); *H04B 7/0671* (2013.01); *H04B 7/0678* (2013.01); *H04B 7/0689* (2013.01); *H04B 7/0697* (2013.01); *H04L 12/189* (2013.01); *H04N 19/30* (2014.11); *H04N 19/59* (2014.11)

(58) Field of Classification Search
CPC .................................................. H08B 7/0413
See application file for complete search history.

(56) References Cited

U.S. PATENT DOCUMENTS

| | | | |
|---|---|---|---|
| 7,181,072 B2 | 2/2007 | Wang et al. | |
| 2003/0236904 A1 | 12/2003 | Walpole et al. | |
| 2009/0156227 A1* | 6/2009 | Frerking | H04B 7/0691 455/455 |
| 2010/0002800 A1* | 1/2010 | Kim | H04L 5/0037 375/295 |
| 2010/0046445 A1 | 2/2010 | Sawahashi et al. | |
| 2010/0074355 A1* | 3/2010 | Nguyen | H04B 7/0613 375/267 |
| 2010/0091641 A1* | 4/2010 | Gaal | H04B 7/0669 370/208 |

(Continued)

OTHER PUBLICATIONS

Liu et al., Prioritized Spatial Multiplexing for MIMO Wireless System with Application to H264 SVC Video, 2010, ICME 2010, 968-973.*

(Continued)

*Primary Examiner* — Rebecca A Volentine (57) ABSTRACT

A multiplexed space-time block coding (M-STBC) scheme is described that allows for transmitting a single multicast transmission in a heterogeneous MIMO (i.e., multiple-input and multiple-output) environment, where receivers with fewer antennas can receive a lower resolution version of the multi-cast transmission, while receivers with a greater number of antennas can receive a higher resolution version of the multi-cast transmission. Thus, the M-STBC scheme allows for transmitting the single multicast transmission that includes both a spatial multiplexing mode and a diversity mode.

20 Claims, 5 Drawing Sheets

(56) References Cited

U.S. PATENT DOCUMENTS

2012/0114021 A1* 5/2012 Chung ............... H04B 7/155
375/211

OTHER PUBLICATIONS

Chai, et al., "Defeating Heterogeneity in Wireless Multicast Networks", In IEEE Infocom, Apr. 15, 2013, 5 pages.

Cortes-Pena, Luis Miguel, "MIMO Space-Time Block Coding (STBC): Simulations and Results", In Proceedings of Design Project: Personal and Mobile Communications, Georgia Tech, Apr. 2009, 8 pages.

Li, et al., "Scalable Video Transmission over Multiuser MIMO-OFDM Systems", In Proceedings of 5th International ICST Conference on Communications and Networking in China, Aug. 25, 2010, 8 pages.

Tham, CK, "Scalable Video Multicast over Diverse Networks", Published on: Aug. 24, 2004, Available at: http://www.eng.nus.edu.sg/EResnews/0310/rd/rd_9.html.

Bakhshali, et al., "Multi-Scalable Video Multicast for Heterogeneous Playback Requirements Using a Perceptual Utility Measure", In IEEE 14th International Workshop on Multimedia Signal Processing, Sep. 17, 2012, 6 pages.

Badic, Biljana, "Space-Time Block Coding for Multiple Antenna Systems", Published on: Nov. 2005, Available at: http://publik.tuwien.ac.at/files/pub-et_10819.pdf.

Li, et al., "Scalable Video Multicast with Adaptive Modulation and Coding in Broadband Wireless Data Systems", In IEEE/ACM Transactions on Networking, vol. 20, Issue 1, Feb. 2012, 12 pages.

Bilen, et al., "Layered Video Multicast Using Diversity Embedded Space Time Codes", In IEEE Sarnoff Symposium, Mar. 30, 2009, 5 pages.

Ohm, et al., "Interframe Wavelet Coding—Motion Picture Representation for Universal Scalability", In Signal Proceedings of Processing: Image Communication, vol. 19, Issue 9, Oct. 2004, 32 pages.

"JSVM Reference Software", Retrieved on: Jul. 12, 2013, Available at: http://www.hhi.fraunhofer.de/de/kompetenzfelder/image-processing/research-groups/image-video-coding/svc-extension-of-h264avc/jsvm-reference-software.html.

Aditya, et al., "FlexCast: Graceful Wireless Video Streaming", In Proceedings of the 17th Annual International Conference on Mobile Computing and Networking, Sep. 19, 2011, 12 pages.

Alamouti, Siavash M., "A Simple Transmit Diversity Technique for Wireless Communications", In IEEE Journal on Select Areas in Communications, vol. 16, Issue 8, Oct. 1998, 8 pages.

"Cisco Visual Networking Index: Global Mobile Data Traffic Forecast Update", Published on: Feb. 6, 2013, Available at: http://www.cisco.com/en/US/solutions/collateral/ns341/ns525/ns537/ns705/ns827/white_paper_c11-520862.pdf.

Correia, et al., "Multi-Resolution Broadcast/Multicast Systems for MBMS", In IEEE Transactions on Broadcasting, vol. 53, Issue 1, Mar. 2007, 11 pages.

Cover, Thomas M, "Broadcast Channels", In IEEE Transactions on Information Theory, vol. 18, Issue 1, Jan. 1972, 13 pages.

Diggavi, et al., "Diversity Embedded Space-Time Codes", In IEEE Transactions on Information Theory, vol. 54, Issue 1, Jan. 2008, 31 pages.

Ding, et al., "Enable Efficient Compound Image Compression in H.264/AVC Intra Coding", In IEEE International Conference on Image Processing, Sep. 16, 2007, 4 pages.

Ganesan, et al., "Space-Time Block Codes: A Maximum SNR Approach", In IEEE Transactions on Information Theory, vol. 47, Issue 4, May 2001, 7 pages.

Gesbert, et al., "From Theory to Practice: An Overview of MIMO Space—Time Coded Wireless Systems", In IEEE Journal on Selected Areas in Communications, vol. 21, Issue 3, Apr. 2003, 22 pages.

Jakubczak, et al., "A Cross-Layer Design for Scalable Mobile Video", In Proceedings of the 17th Annual International Conference on Mobile Computing and Networking, Sep. 19, 2011, 12 pages.

Kuo, et al., "An Embedded Space-Time Coding (STC) Scheme for Broadcasting", In IEEE Transactions on Broadcasting, vol. 53, Issue 1, Mar. 2007, 11 pages.

Lee, et al., "Optimal Linear Coding for Vector Channels", In IEEE Transactions on Communications, vol. 24, Issue 12, Dec. 1976, 8 pages.

Lin, et al., "Random Access Heterogeneous MIMO Networks", In Proceedings of the ACM SIGCOMM Conference, Aug. 15, 2011, 12 pages.

Liu, et al., "ParCast: Soft Video Delivery in MIMO-OFDM WLANs", In Proceedings of the 18th Annual International Conference on Mobile Computing and Networking, Aug. 22, 2012, 12 pages.

Liu, et al., "Compressive Broadcast in MIMO Systems with Receive Antenna Heterogeneity", In 31st Annual IEEE International Conference on Computer Communications: Mini-Conference, Mar. 25, 2012, 5 pages.

Ramchandran, et al., "Multiresolution Broadcast for Digital HDTV Using Joint Source/Channel Coding", In IEEE Journal on Selected Areas in Communications, vol. 11, Issue 1, Jan. 1993, 18 pages.

Schwarz, et al., "Overview of the Scalable Video Coding Extension of the H.264/AVC Standard", In IEEE Transactions on Circuits and Systems for Video Technology, vol. 17, Issue 9, Sep. 2007, 18 pages.

Sen, et al., "Design and Implementation of an "Approximate" Communication System for Wireless Media Applications", In Proceedings of the ACM SIGCOMM Conference, Aug. 30, 2010, 12 pages.

Spencer, et al., "Zero-Forcing Methods for Downlink Spatial Multiplexing in Multiuser MIMO Channels", In IEEE Transactions on Signal Processing, vol. 52, Issue 2, Feb. 2004, 11 pages.

Sullivan, et al., "Overview of the High Efficiency Video Coding (HEVC) Standard", In IEEE Transactions on Circuits and Systems for Video Technology, vol. 22, Issue 12, Dec. 2012, 20 pages.

Tan, et al., "Sora: High-performance Software Radio using General Purpose Multi-Core Processors", In Proceedings of Communications of the Association for Computing Machinery, vol. 54, Issue 1, Jan. 2011, 16 pages.

Wiegand, et al., "Overview of the H.264/AVC Video Coding Standard", In IEEE Transactions on Circuits and Systems for Video Technology, vol. 13, Issue 7, Jul. 2003, 17 pages.

"Digital Video Broadcast", Retrieved From «http://www.etsi.org/deliver/etsi_en/300700_300799/300744/01.06.01_60/en_300744v010601p.pdf», Jan. 2009, 66 Pages.

* cited by examiner

SPATIAL SCALABLE VIDEO MULTICAST FOR HETEROGENEOUS MIMO SYSTEMS

BACKGROUND

The growing demand for real-time streaming video on portable devices has increased the importance of multimedia multicast in wireless networks, such as mobile wireless networks. Multiple-input and multiple-output (MIMO) is a technology that utilizes multiple antennas at a transmitter and/or receivers to improve communication performance.

Space-time block coding (STBC) is a technique often used in conjunction with MIMO in wireless communications to transmit multiple copies of a data stream across a number of antennas and to exploit the various received versions of the data to improve the reliability of data-transfer and/or the amount of data transferred in a given bandwidth. STBC code is generally constructed according to agreed upon transmit and receive antenna configurations.

Hence, STBC cannot adapt to client antenna heterogeneity, as the number of transmit and receive antennas must be known for successful reception by all target receiving devices. Thus, as devices with different numbers of antennas are likely to coexist, the spatial multiplexing gain of the entire multicast group is limited by the device with the fewest number of antennas. The cost of tracking the hardware capabilities of receivers can be excessive in the presence of a high client churn. Hence, conventional multicast transmitters must be conservative in employing additional spatial dimensions so that all devices in the multicast group can properly receive a multicast transmission.

Additionally, different mobile devices, including smart phones, tablets, and laptops, have diverse screen sizes that result in resolution heterogeneity. Thus, screen size and other device capabilities may further limit the types of multicast transmissions that can be properly displayed by each device in the multicast group.

SUMMARY

This application describes techniques for a multiplexed space-time block coding (M-STBC) scheme. The M-STBC scheme allows for transmitting a single multicast transmission (e.g., video) in a heterogeneous MIMO (i.e., multiple-input and multiple-output) environment, where receivers with fewer antennas can receive a lower quality (e.g. low resolution) version of the multi-cast transmission, while receivers with a greater number of antennas can receive a higher quality (e.g. high resolution) version of the multi-cast transmission. Thus, the M-STBC scheme allows for transmitting the single multicast transmission that includes multiple modes, such as a spatial multiplexing mode and a diversity mode, for example.

M-STBC uses a prediction-based pairing algorithm to find or construct data pairs of similar values in the transmitted signal, and to weight transmit signals by a positive factor in the received signal. That is, if channel fading coefficients happen to exhibit opposite signs, transmitted symbols will not be subtracted from each other. As a result, M-STBC allows single-antenna receivers to achieve diversity gain as in conventional STBC schemes, while simultaneously allowing multi-antenna receivers to benefit from multiplexing gain.

In one example, at the sender (e.g., multi-antenna transmitter), a video stream is divided into multiple different resolution sequences (e.g., four) through a spatial partitioning. Pixel-shift prediction is used to increase similarity between sub-streams (e.g., sequences). A 3-dimensional discrete cosine transform (3D-DCT) and/or power scaling may then be applied to each sub-stream. Pair-wise similar signals may be formed by directional pairing (e.g., pairing in a horizontal, vertical and/or diagonal direction) as an input to M-STBC for generating the transmitted signal. At the receiver, decoding can be performed in one of the multiple different modes (e.g., diversity or multiplexing mode) depending on compatible video resolutions and a number of antennas of various receivers. These techniques allow heterogeneous users to receive multicast video at a resolution commensurate with a number of receive antennas and at a quality commensurate with a channel condition at each receiver. Moreover, receivers with multiple antennas can seamlessly switch between diversity mode or multiplexing mode based on, for example, current channel conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to circuitry, hardware logic, device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
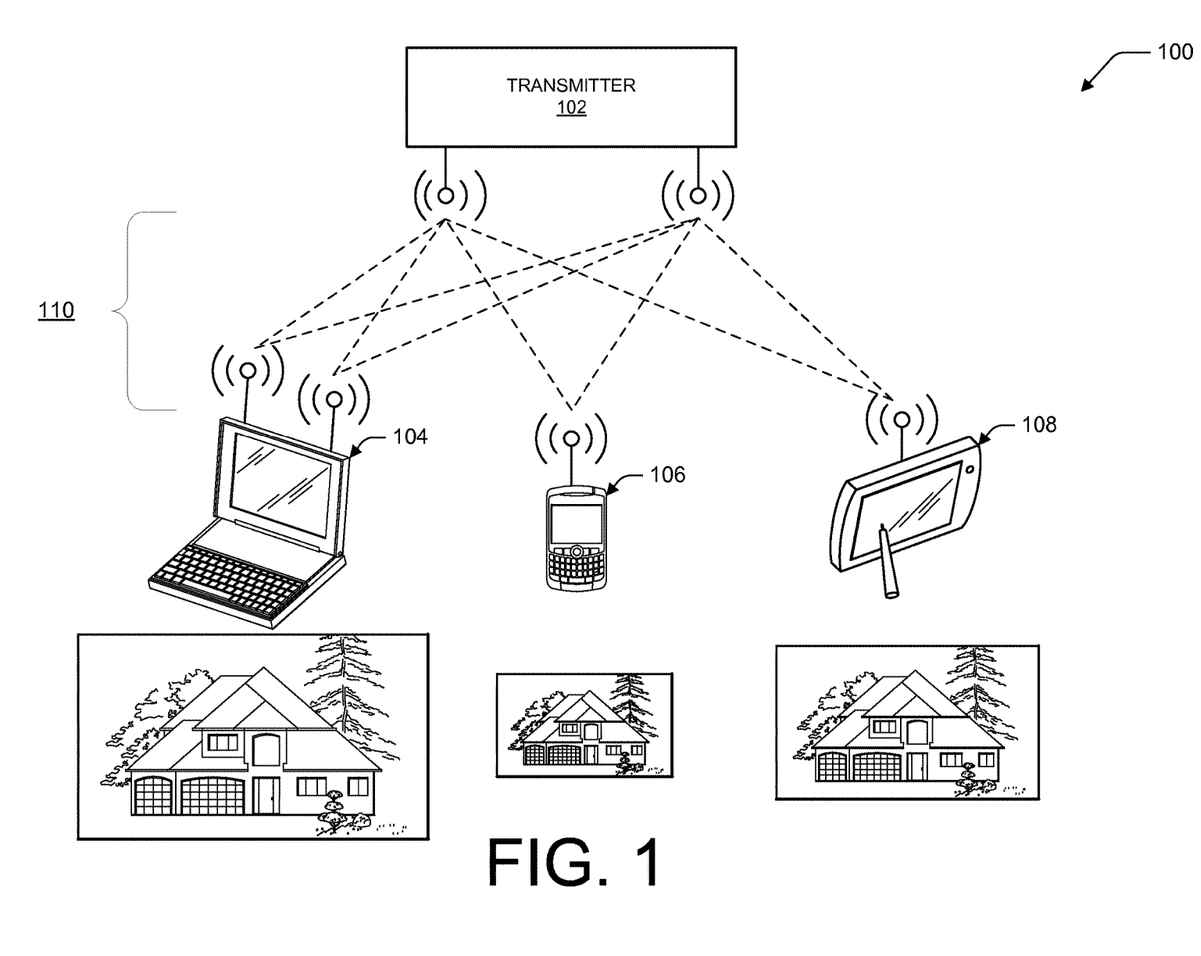
FIG. 1 is a pictorial diagram of an example environment for illustrating antenna and resolution heterogeneity in a multicast group.

FIG. 1 shows an example environment 100 illustrating a {1,2}×2 MIMO (multiple-input and multiple-output) system, where transmitter 102 utilizes two transmit antennas to provide, for example, video multicast to receivers with one or two (i.e., {1,2}) antennas in a heterogeneous MIMO system. As shown in FIG. 1, receiver 104 is a 2-antenna receiver and receivers 106 and 108 are 1-antenna receivers. Moreover, receivers 104, 106 and 108 are shown having various display resolution capabilities. In other embodiments, transmitters and receivers may have more and/or different numbers of antennas than those shown in this example. Often, devices with a greater number of antennas support higher resolution display of multicast video. Although FIG. 1 focuses on a {1,2}×2 MIMO system, the techniques described herein can be readily extended to other antenna and resolution settings. To address issues associated with antenna heterogeneity and resolution heterogeneity, techniques are described herein for generating a multiplexed space-time block coding (M-STBC) signal that allows for "downsampling in the air", such that each of receivers 104, 106 and 108 may receive and display video commensurate with a highest resolution of which each individual device is capable. Thus, as an example, transmitter 102 transmits a single signal 110 such that device 104, shown having two antennas, may decode the transmitted signal using multiple modes (e.g., diversity or multiplexing mode), while devices 106 and 108, shown having single antennas, can simultaneously decode the transmitted signal 110 using a single mode (e.g., diversity mode).

Signals in a multi-path transmission channel are affected by different fading coefficients. As an example, let $h_1$ and $h_2$ denote the fading coefficients observed by a 1-antenna receiver (e.g., device 106), and $h_{11}$, $h_{12}$, $h_{21}$ and $h_{22}$ denote the fading coefficients observed by a 2-antenna receiver (e.g., device 104). In general, the fading coefficients can be known at the receivers. For simplicity and without loss of generality, consider a length-4N one-dimensional signal $s=(s_1, s_2, \ldots s_{4N})$ to be transmitted by transmitter 102, with an assumption on s that adjacent signal samples are likely to have similar values.

Denote $x_1$ and $x_2$ as the transmitted signals of the two antennas of transmitter 102 in a particular time slot. The received signals at the 2-antenna receiver are:

$$y_1 = h_{11}x_1 + h_{21}x_2$$

$$y_2 = h_{12}x_1 + h_{22}x_2 \quad (1)$$

With these two equations, $x_1$ and $x_2$ can be successfully decoded. However, a 1-antenna receiver will only receive:

$$y = h_1 x_1 + h_2 x_2 \quad (2)$$

It is generally not possible to decode $x_1$ and $x_2$ separately, as y is a weighted sum of the two transmitted signals. Therefore, if signal s is transmitted in 2N time slots, and in the $t^{th}$ time slot, the transmitted signals (are denoted by $x_1^{(t)} = s_{2t-1}$ and $x_2^{(t)} = s_{2t}$, the 1-antenna receiver would obtain a length-2N downsampled signal of s. However, the channel fading coefficients are not under any station's control. When $\text{sign}(h_1) = \text{sign}(h_2)$, no matter which coefficient is larger in absolute value, y is an interpolation of $x_1$ and $x_2$. Thus, the channel is analogous to a low-pass filter. However, when $\text{sign}(h_1) \neq \text{sign}(h_2)$, the channel becomes a high-pass filter, and the received signal y contains high-frequency information (e.g., a difference between $x_1$ and $x_2$), which is undesired at the 1-antenna receiver.

M-STBC effectively realizes a "downsampling in the air" in order to provide a feasible solution for antenna heterogeneity. Alamouti's code designed for a two-transmit antenna system, indicates that:

$$C_2 = \begin{pmatrix} c_1 & c_2 \\ -c_2^* & c_1^* \end{pmatrix}, \quad (3)$$

where $c_i$'s (i.e., i=1 . . . 4) are complex symbols, and * denotes a complex conjugate of a symbol. Each row in equation (3) above represents a time slot and each column represents an antenna of a transmitter. In general, this formulation of Alamouti's code is used for a transmitter with two antennas and receivers with one antenna. Denote $y^{(1)}$ and $y^{(2)}$ as the received signals in the two time slots at a 1-antenna receiver. Assuming that the fading coefficients ($h_1$ and $h_2$) remain un-changed in the two time slots, then the transmitted signals can be decoded by:

$$\hat{c}_1 = \frac{h_1^* y^{(1)} + h_2 y^{(2)*}}{\|h_1\|^2 + \|h_2\|^2}, \hat{c}_2 = \frac{h_2^* y^{(1)} + h_1 y^{(2)*}}{\|h_1\|^2 + \|h_2\|^2} \quad (4)$$

Alamouti's code is a common full-rate STBC, but it is unable to achieve multiplexing gain. M-STBC, as described herein, allows for 2-antenna receivers to utilize multiplexing gain, while simultaneously allowing 1-antenna receivers to utilize diversity gain. The M-STBC code for a 2-transmit antenna system can be represented by:

$$MC_2 = \begin{pmatrix} x_1 & x_3 \\ -x_4^* & x_2^* \end{pmatrix} \quad (5)$$

Using equation (5), a 2-antenna receiver can fully decode all four signals (i.e., $x_1$, $x_2$, $x_3$ and $x_4$) transmitted by 2 antennas in two time slots. When $x_1 = x_2$ and $x_3 = x_4$, equation (5) represents equation (3) for Alamouti's code. For a 1-antenna receiver, Alamouti's decoding can be used as described in equation (4), where deduction yields:

$$\hat{x}_{1,2} = \frac{\|h_1\|^2 x_1 + \|h_2\|^2 x_2}{\sum_{i=1,2} \|h_i\|^2} + \frac{h_1^* h_2}{\sum_{i=1,2} \|h_i\|^2} (x_3 - x_4) \quad (6)$$

$$\hat{x}_{3,4} = \frac{\|h_2\|^2 x_3 + \|h_1\|^2 x_4}{\sum_{i=1,2} \|h_i\|^2} + \frac{h_1 h_2^*}{\sum_{i=1,2} \|h_i\|^2} (x_1 - x_2)$$

A per equation (6), $\hat{x}_{s,t}$ denotes an estimation of the interpolation of $x_s$ and $x_t$. The first term on the right sides of both equations in equation (6) is the linear interpolation of two signals. As an example, note that in equation (6), if $\text{sign}(h_1) \neq \text{sign}(h_2)$, the estimated signals will not comprise a difference of the transmitted symbols, as the fading coefficients are squared. The second term on the right in equation (6) can be considered an artificial error. In this error term, the first factor is bounded such that:

$$\left\| \frac{h_1^* h_2}{\sum_{i=1,2} \|h_i\|^2} \right\| \leq \frac{1}{2} \text{ and } \left\| \frac{h_1 h_2^*}{\sum_{i=1,2} \|h_i\|^2} \right\| \leq \frac{1}{2} \quad (7)$$

The second factor (i.e., the artificial error) would be small if $x_1 \approx x_2$ and $x_3 \approx x_4$. For natural signals, such as images or videos, the adjacent signal samples are likely to be similar. Hence, M-STBC provides for downsampling in the air for 1-antenna receivers. In equation (6), both fading coefficients and transmitted signals could be complex numbers. In particular, a length-2N complex signal x can be constructed from the original length-4N signal s, and transmitted in N time slots. The complex signal can be constructed by:

$$x_{2i-1} = s_{4i-3} + j s_{4i-1}; x_{2i} = s_{4i-2} + j s_{4i}, \quad (8)$$

where $i=1, \ldots N$, and $j=\sqrt{-1}$ is the imaginary unit. At the 1-antenna receiver, the linear interpolation can be obtained by:

$$\hat{s}_{4i-3,4i-2} = R(\hat{x}_{2i-1,2i})$$

$$\hat{s}_{4i-1,4i} = I(\hat{x}_{2i-1,2i}), \quad (9)$$

where $R(\cdot)$ and $I(\cdot)$ denote the real part and imaginary part of a complex number.

Figure 2:
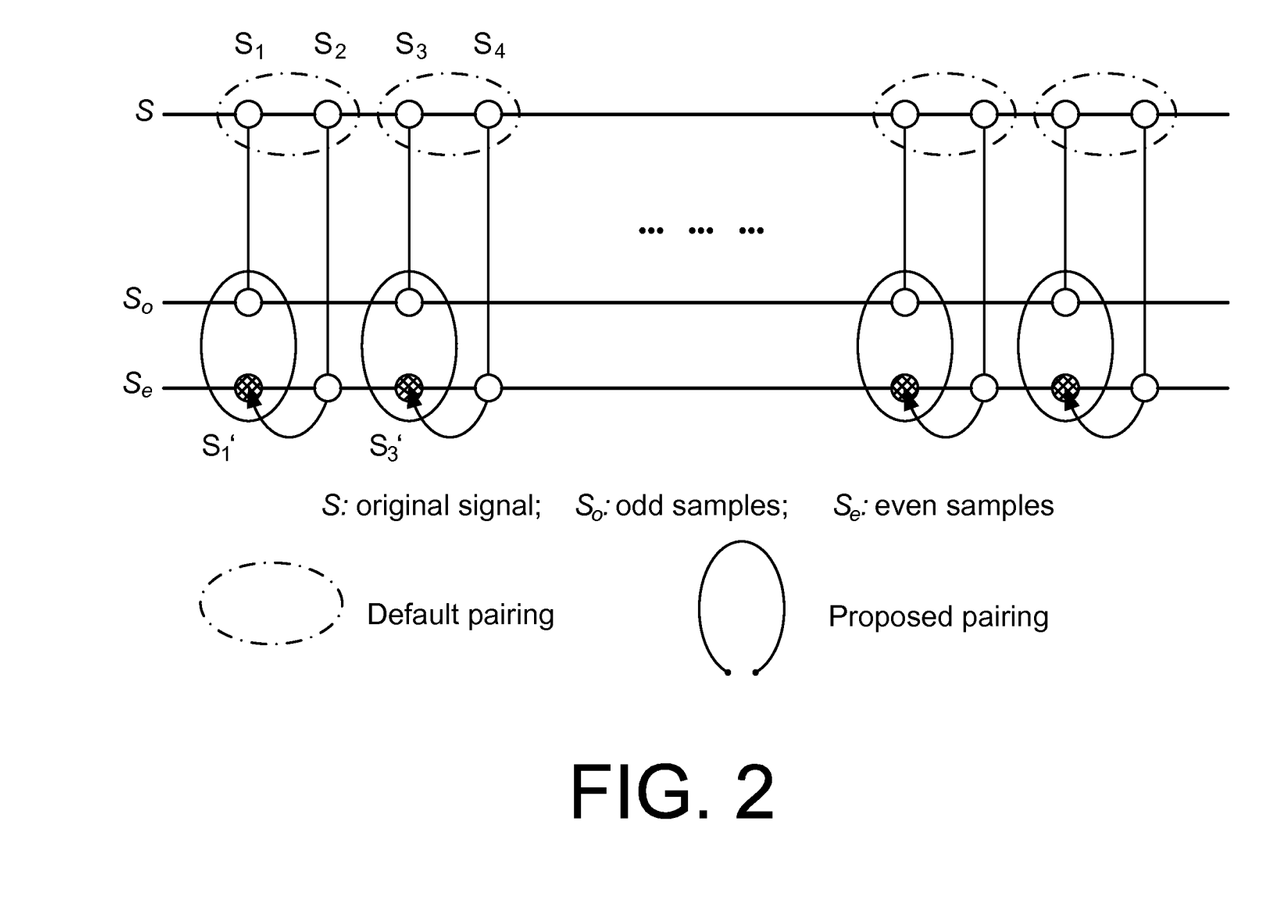
FIG. 2 is a symbolic diagram of an example technique for pairing pixels in a frame of a video stream.

M-STBC is designed to have similar sample pairs in the transmitted signal. Techniques are described herein to increase the similarity between sample pairs for natural signals. FIG. 2 illustrates an example technique for increasing similarity between sample pairs of samples, such as pixels in a frame of a video. Given signal s, a default pairing is shown between adjacent samples $s_{2i-1}$ and $s_{2i}$. In a proposed technique, as illustrated in FIG. 2, two samples $s_o$ and $s_e$ are extracted from s, where $s_o$ contains odd-numbered samples and $s_e$ contains even-numbered samples. Then a prediction of $s_o$ can be created, denoted by $s_o' = (s_1', s_3', \ldots)$, based on $s_e$, denoted by:

$$s_o' = (s_1', s_3', \ldots) = P_{e \to o}(s_e), \tag{10}$$

where $P_{e \to o}(\bullet)$ denotes a prediction function from even samples to odd samples. Now $s_1$ can be paired with its prediction $s_1'$, $s_3$ can be paired with its prediction $s_3'$ and so on. If the signal has favorable features (e.g., smooth) and the prediction is precise, the similarity between $s_{2i-1}$ and $s_{2i-1}'$ be higher than the similarity between $s_{2i-1}$ and $s_{2i}$.

With this technique, transmitter 102 transmits $s_o$ and $s_o'$ instead of s. In a particular time slot, the 1-antenna receiver will obtain a linear interpolation of $s_{2i-1}$ and $s_{2i-1}'$, which is ideally an approximation of $s_{2i-1}$. The 2-antenna receiver can decode exactly $s_{2i-1}$ and $s_{2i-1}'$. However, in order to obtain the original signal s, the 2-antenna receiver needs to reconstruct $s_e$ from $s_o'$. This poses an invertible constraint on the prediction function. In other words, prediction functions are utilized which satisfy:

$$P_{o \to e}(s_o') = P_{o \to e}(P_{e \to o}(s_e)) = s_e \tag{11}$$

Example Transmitter Implementation

An M-STBC transmitter as described herein constructs and transmits a signal that effectively provides for "down-sampling in the air". That is, it allows receivers with fewer antennas (e.g., one) to receive and decode a lower resolution video, while allowing receivers with multiple antennas (e.g., two) to receive and decode a higher resolution video. This provides benefit to a video multicast scenario when receivers exhibit antenna and resolution heterogeneity. Often, devices with multiple antennas are equipped with a greater display resolution than devices with fewer, or just one, antenna. To provide these benefits, a transmitter will find or construct data pairs of similar value from video streams, such that receivers with different numbers of antennas can decode the received signal and reconstruct the video at a desired resolution. The techniques described herein provide for a general video-multicast framework which can be applied to a variety of other system configurations. For purposes of simplicity, the techniques described herein focus on a $\{1,2\} \times 2$ MIMO system. However, the techniques described herein can be readily extended to other antenna and resolution settings.

The M-STBC described herein utilizes data pairs of similar value in video streams to construct a transmitted signal where receivers with different numbers of antennas can decode the signal and reconstruct the video to a desired resolution.

Figure 3:
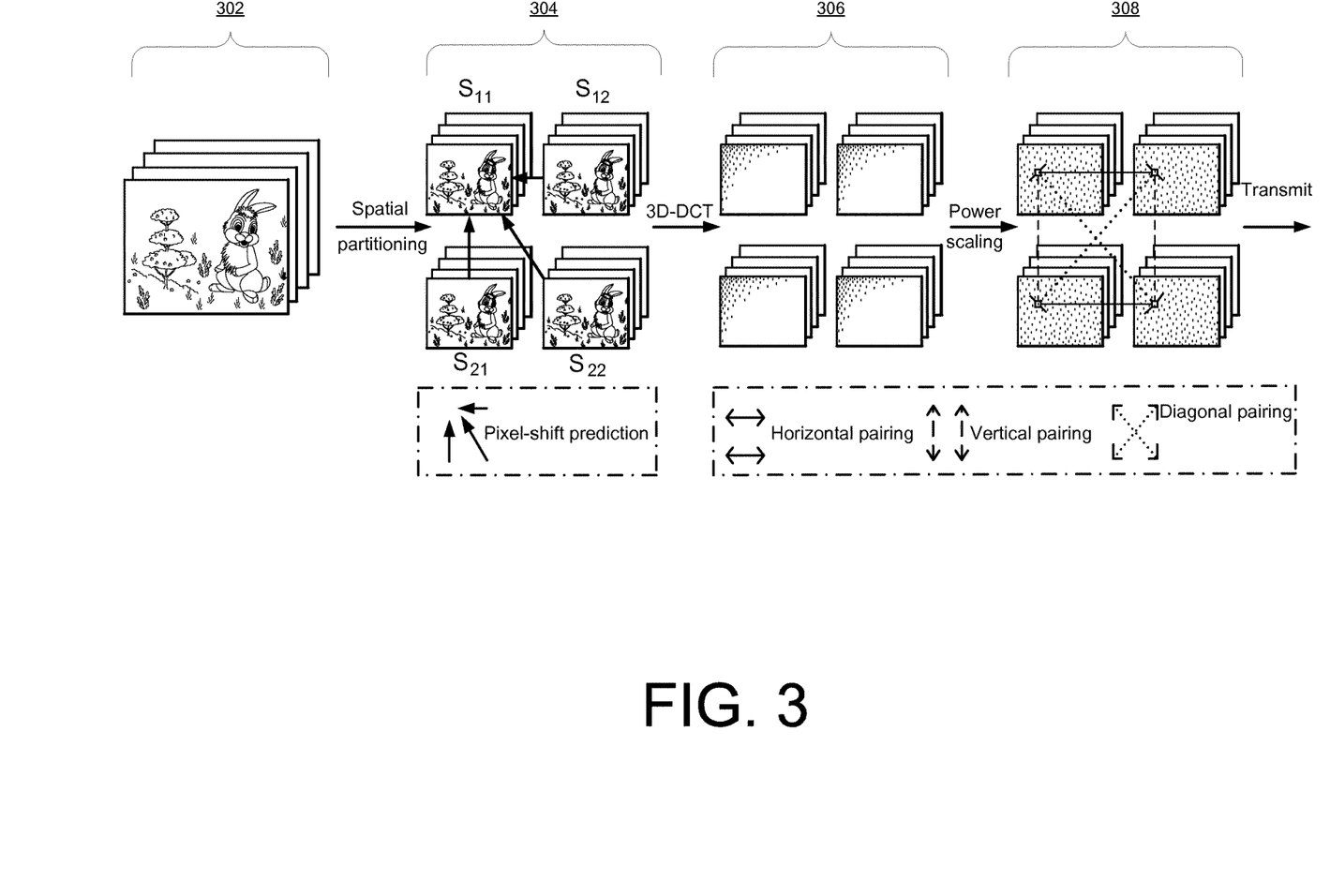
FIG. 3 is a symbolic diagram of an example multiplexed space-time block coding (M-STBC) technique.

FIG. 3 illustrates an example processing in a sender (e.g., transmitter 102) to construct and transmit a M-STBC signal. Source frames 302 comprise a video sequence $S = \{s_{w,h}^t\}$, where $1 \leq w \leq W$, $1 \leq h \leq H$, $1 \leq t \leq T$, and W, H and T are the width, height and the number of frames of the video, respectively. Thus, a sender can process S in, for example, the following operations:

Operation 1. Extract four low-resolution $$\left(\frac{W}{2} \times \frac{H}{2}\right)$$

sequences (e.g., sub-sampled images/sequences), denoted by pixel sequences 304 (i.e., $S_{11}$, $S_{12}$, $S_{21}$ and $S_{22}$), from frames of S. In particular, divide each frame in the original sequence S (e.g., at 302) into 2×2 blocks, and assign each pixel in a block to a different sequence $S_{11}$, $S_{12}$, $S_{21}$ and $S_{22}$ at 304. Thus, FIG. 3 illustrates a top frame (e.g., at t=1) in 302 divided (e.g., sub-sampled) into the four top sub-sampled frames $S_{11}$, $S_{12}$, $S_{21}$ and $S_{22}$ at 304. As an example, sequences $S_{11}$, $S_{12}$, $S_{21}$ and $S_{22}$ may be associated with pixel locations in the 2×2 block denoted as:

$$\begin{pmatrix} S_{11} & S_{12} \\ S_{21} & S_{22} \end{pmatrix} \tag{12}$$

Operation 2. Predict sequence $S_{11}$ in 304 from the other three sequences $S_{12}$, $S_{21}$ and $S_{22}$ (i.e., perform pixel shift predictions) in 304. In particular, three prediction functions, denoted by $P_{\leftarrow}(\bullet)$, $P_{\uparrow}(\bullet)$ and $P_{\nwarrow}(\bullet)$, can be used. The predicted sequences of $S_{11}$ can be denoted by:

$$S_{12}' = P_{\leftarrow}(S_{12}), \; S_{21}' = P_{\uparrow}(S_{21}), \; S_{22}' = P_{\nwarrow}(S_{22}) \tag{13}$$

Thus, in FIG. 3, at 304, sequence $S_{12}$ may be replaced with sequence $S_{12}'$, sequence $S_{21}$ may be replaced with sequence $S_{21}'$ and sequence $S_{22}$ may be replaced with sequence $S_{22}'$. In general, values of the predicted sequences are very close to corresponding values in $S_{11}$. Thus, the sequences at 304 may be denoted as:

$$\begin{pmatrix} S_{11} & S_{12}' \\ S_{21}' & S_{22}' \end{pmatrix} \tag{14}$$

Operation 3. For each of the four sequences $S_{11}$, $S_{12}'$, $S_{21}'$ and $S_{22}'$, divide frames into group of pictures (GOPs) (e.g., 4 frames, 8 frames, etc.), and perform a 3-dimensional discrete cosine transform (3D-DCT) for each GOP. As shown in FIG. 3, at 306, the four sequences $S_{11}$, $S_{12}'$, $S_{21}'$, and $S_{22}'$ are represented by their complex DCT coefficients.

Operation 4. Perform power allocation through scaling each of the DCT coefficients in the four sequences associated with the GOP in 306 to generate the four corresponding scaled sequences at 308. In various embodiments, the scaling factors used to scale the corresponding coefficients in each of the four sequences are the same. The scaling is done in part to facilitate transmission efficiency.

Operation 5. Perform directional pairing within each 2×2 block composed of the corresponding DCT coefficients in the four sequences at 308. The pairs of corresponding DCT coefficients (e.g., complex symbols) are scaled at least in part to balance the diversity and multiplex gains and to create symbol pairs of more similar values.

Operation 6. Transmit the paired complex symbols with $MC_2$ as defined in equation (5).

Various aspects of operations 1-6 are described below in greater detail.

Example Pixel-Shift Prediction

As discussed in operation 2 above, the pixel-shift prediction may be performed with respect to frames of data. Let $s_{\bullet,h}^{t}$ denote the $h^{th}$ row of pixels in the $t^{th}$ frame of the video sequence s (e.g., at 302) to be transmitted. As an example, when h is an odd number, pixels in $s_{\bullet,h}^{t}$ will be assigned to sequence $S_{11}$ and $S_{12}$ at 304. When h is an even number, pixels in $s_{\bullet,h}^{t}$ will be assigned to sequence $S_{21}$ and $S_{22}$ at 304. Under an assumption that h is odd, pixel-shift prediction through a construction of mapping function $P_{\leftarrow}(\bullet)$ is described below.

Following the notations in FIG. 2, $s_o$ and $s_e$ denote the two extracted signals from s. They are the $$\left(\frac{h+1}{2}\right)^{th}$$

row in the $t^{th}$ frame of sequence $S_{11}$ and $S_{12}$ respectively, both with a length of $$\left(\frac{W}{2}\right).$$

Therefore, the mapping function $P_{\leftarrow}(\bullet)$ predicts $s_o$ from $s_e$.

In various embodiments, a finite impulse response (FIR) filter is used to perform predictions. Table 1 illustrates filter tap values that may be used for the FIR filter. Thus, the estimation of $s_o[k]$ (shown without superscript t and subscript $\bullet$, h) may be performed as:

$$\hat{s}_o[k] = \frac{1}{64} \sum_{i=-4}^{3} f[i] \cdot s_e[k+i] \tag{15}$$

The mapping $P_{\leftarrow}(\bullet)$ is realized by repeating the above process for each of the $$\frac{H}{2}$$

rows in $S_{12}$, such that $S_{12}'$ is a prediction of $S_{11}$. Similarly, the mapping $P_{\uparrow}(\bullet)$ can be realized by calculating the half-pixel prediction for each of the $$\frac{W}{2}$$

rows in $S_{21}$, such that $S_{21}'$ is a prediction of $S_{11}$. The mapping $PP_{\nwarrow}(\bullet)$ can be implemented easily by concatenating $P_{\leftarrow}(\bullet)$ and $P_{\uparrow}(\bullet)$, such that $S_{22}'$ is a prediction of $S_{11}$. As an example of concatenating $P_{\leftarrow}(\bullet)$ and $P_{\uparrow}(\bullet)$, in a 2×2 block of pixels, the pixel in the bottom right of the 2×2 block may be used to estimate the pixel in the bottom left of the block, which is then used to estimate the pixel in the upper left of the block (e.g., in $S_{11}$). The computational complexity of pixel-shift prediction is moderate, as prediction of each pixel only involves a few multiplications and additions.

TABLE 1

FIR filter tap values

| Index i | −4 | −3 | −2 | −1 | 0 | +1 | +2 | +3 |
|---|---|---|---|---|---|---|---|---|
| f[i] | −1 | 4 | −11 | 40 | 40 | −11 | 4 | 1 |

Example Power Scaling

Communication systems operate under a total power constraint, such as a constraint of available transmit power. Therefore, in order to optimize the system performance under the mean squared error (MSE) criterion, the transmitted signal can be de-correlated and encoded by a single-letter coding scheme. For video streams, de-correlation can be achieved by performing the 3D-DCT on a group of pictures (e.g., at 306), while the single-letter coding can be achieved by scaling each DCT coefficient according to its variance (e.g., at 308). The scaling factors can be transmitted to the receivers as metadata for successful decoding, and therefore consume some additional bandwidth. In order to reduce the overhead of the metadata, each frame is divided into chunks and the values within each chunk are modeled as random variables from a same distribution.

Thus, processing at a transmitter may perform 3D-DCTs over each GOP (i.e., group of pictures) of the four low-resolution sequences $S_{11}$, $S_{12}'$, $S_{21}'$ and $S_{22}'$. The GOP size may be set to a fixed number (e.g., 4 frames, 8 frames, etc.) to strike a good balance between de-correlation efficiency and processing complexity. Then, the DCT coefficients in each frame may be divided into chunks (e.g., 64 chunks per frame), each chunk with a size of, for example, $$\left(\frac{W}{16} \times \frac{H}{16}\right).$$

The values in the corresponding chunks of the four sequences may be modeled as random variables of the same distribution. Let $\bar{\lambda}_l$ denote the average variance of the $i^{th}$ (i=1, . . . 64) chunk in a particular GOP of the four sequences. Then, the scaling factor for all the coefficients in this chunk, denoted by $g_i$, can be computed by:

$$g_i = (\bar{\lambda}_l)^{-\frac{1}{4}} \sqrt{\frac{P}{\sum_i \bar{\lambda}_l}} \tag{16}$$

In equation (16), P is the total power budget for this GOP. Thus, the coefficients in each chunk will have the same scaling factor. All four sequences share the same scaling factor for coefficients at the same position, otherwise, the similarity between coefficients may be lost. Thus, for the $i^{th}$ chunk, at 308, all four sequences in the position of the $i^{th}$ chunk are scaled by $g_i$. In general, the scaling factors for each chunk are sent to receivers as metadata. After power scaling, as shown at 308 in FIG. 3, the values of the coefficients in each sequence are closer to each other and more uniformly distributed.

Example Directional Pairing and Pair-wise Scaling

Both directional pairing and pair-wise scaling are usable to create symbol pairs of similar values in M-STBC code. Recall in the $MC_2$ decoding in equation (6), pairing between similar complex symbols (between $x_1$ and $x_2$ and between $x_3$ and $x_4$) will reduce the artificial error introduced to the data pair that are transmitted in the same M-STBC code.

Regarding directional pairing, a high spatial correlation at different positions of a video frame could occur in different directions. As an example, if the correlation is strong in horizontal (vertical) direction, the prediction of $S_{11}$ from $S_{12}$ ($S_{21}$) should be the most accurate prediction, and the prediction from $S_{21}$ ($S_{12}$) and $S_{22}$ should be the most accurate prediction also. A transmitter can be configured to determine a direction of the directional pairing that provides the highest spatial correlation, or a highest average spatial correlation.

As an example, pairing of similar scaled DCT coefficients is performed on a 2×2 block composed of the corresponding coefficients in the four low-resolution sequences (one original and three predicted). Let $c_{11}$, $c_{12}'$, $c_{21}'$ and $c_{22}'$ denote the four extracted coefficients from the four sequences corresponding to a particular position in a frame. Pairing may be performed to create two similar complex symbols $x_1$ and $x_1'$ from these four coefficients. There are at least three pairing choices, namely horizontal, vertical and diagonal, as shown in FIG. 3. The selection among these three choices may be based on a sum of absolute differences (SAD) criterion. The complex symbols created for each of the three directional choices can be shown as:

$$x_1^H = c_{11} + jc_{21}'; \; x_1'^H = c_{12}' + jc_{22}'$$

$$x_1^V = c_{11} + jc_{12}'; \; x_1'^V = c_{21}' + jc_{22}'$$

$$x_1^D = c_{11} + jc_{12}'; \; x_1'^D = c_{22}' + jc_{21}' \tag{17}$$

In equation (17), H, V and D correspond to horizontal, vertical and diagonal pairing, respectively. As an example, a horizontal pairing mode may be selected by a transmitter if $c_{11}$ and $c_{21}'$, and $c_{12}'$ and $c_{22}'$ have similar values. The mode of pairing may be transmitted to the receivers as metadata. An entropy coding algorithm may be used to compress the mode data. To reduce the overhead, as an example, every 8×8 block in the original frame can share a same directional mode. After pairs of complex symbols are created, the sender can perform pair-wise scaling with respect to the mean of the pair. This pair-wise scaling acts to make $x_1$ and $x_1'$ even more similar. The pair-wise scaling can provide a balance between diversity mode gain and multiplex mode gain in the transmitted signal. The scaling can be calculated as:

$$x_1 \leftarrow \frac{x_1 + x_1'}{2} + \alpha \cdot \frac{x_1 - x_1'}{2}, \tag{18}$$

$$x_1' \leftarrow \frac{x_1 + x_1'}{2} + \alpha \cdot \frac{x_1' - x_1}{2},$$

where $0 \leq \alpha \leq 1$ is the scaling factor. As an example, for $\alpha=0$, $x_1=(x_1+x_1')/2$ and $x_1'=(x_1+x_1')/2$, and for $\alpha=1$, $x_1=x_1$ and $x_1'=x_1'$. Thus, $x_1$ and $x_1'$ should be very similar, as their real and imaginary values are very similar due at least in part to the directional pairing, and $\alpha$ may be used to further increase their similarity. Let $x_2$ and $x_2'$ be the symbol pair transmitted in a same M-STBC code as $x_1$ and $x_1'$. When $\alpha<1$, the difference between $x_1$ and $x_1'$ is reduced. Thus, the artificial error introduced to $\hat{x}_2$ (the weighted sum of $x_2$ and $x_2'$) will be reduced also. For 1-antenna receivers which only decode in the diversity mode, $\alpha$ should be as small as possible. However, scaling with a small $\alpha$ may have an adverse impact for 2-antenna receivers when decoding in multiplexing mode, because the channel noise can be amplified by $$\frac{1}{\alpha}.$$

Generally speaking, $\alpha$ is a tunable parameter which trades off the performance between diversity mode decoding and multiplex mode decoding. The scaled symbol pairs will be transmitted using the M-STBC code $MC_2$. For clarity, equation (5) may be re-written into the following form:

$$MC_2 = \begin{pmatrix} x_1 & x_2 \\ -x_2'^* & x_1'^* \end{pmatrix} \tag{19}$$

Thus, a signal transmitted using the M-STBC code $MC_2$ simultaneously supports diversity mode decoding and multiplex mode decoding by a 2-antenna receiver, as four different symbols are transmitted in two time slots, as shown in equation (19). Moreover, M-STBC code $MC_2$ supports diversity mode decoding for a 1-antenna receiver, as described above in equation (6), due at least in part to the high similarity between $x_1$ and $x_1'$, and between $x_2$ and $x_2'$.

Example Receiver Implementations

As described herein, receivers are capable of decoding signals in at least two modes, namely diversity mode and multiplexing mode. While 1-antenna receivers may only work in diversity mode, 2-antenna receivers have their choices between the two decoding modes according to the perceived channel quality. Note that this capability of 2-antenna receivers to choose a decoding mode is an example of a capability that differentiates the techniques described herein from conventional multicast systems. In other examples, the techniques described herein may be used to implement additional or alternative modes (e.g., high, medium and low resolution modes). As an example, in a low signal-to-noise ratio (SNR) environment (e.g., <20 dB), a 2-antenna receiver can seamlessly switch to diversity mode operation, while seamlessly switching to multiplexing mode in a high SNR environment. Thus, a 2-antenna receiver using the techniques described herein can seamlessly switch decoding modes to optimize a quality of a received signal.

For conventional multicast, it is not possible for any strong receivers (e.g., 2-antenna receivers) to recover more information because the amount of information that can be recovered is constrained by the weakest receiver (e.g., 1-antenna receiver).

Consider the M-STBC transmission of codeword X as defined in equation (19). Assume that the fading coefficients remain unchanged within two sequential time slots, then the channel gain of receive antenna r can be represented by $h_r=(h_{1r},h_{2r})^T$. Let $y_r=(y_r^1,y_r^2)^T$ denote the received signals at antenna r during the two time slots, then we have:

$$y_r = Xh_r + n, \tag{20}$$

where $n=(n^1 n^2)^T$ is the perceived noise at antenna r. Without loss of generality, the noise may be assumed to be additive, white and Gaussian. Therefore, the subscript for n is omitted.

Example Diversity Mode Detection

For the receiver operating in diversity mode, even when the receiver has two antennas, decoding is performed separately for each antenna, and it is assumed that $x_1 = x_1' = \hat{x}_1$ and $x_2 = x_2' = \hat{x}_2$. Given the received signals $y_r^1$ and $y_r^2$, $\hat{x}_1$ and $\hat{x}_2$ can be decoded by:

$$\hat{x}_r = (\hat{x}_1^r \hat{x}_2^r) = \frac{1}{\|h_r\|^2} (y_r^1 y_r^{2*}) \begin{pmatrix} h_{1r}^* & h_{2r}^* \\ h_{2r} & -h_{1r} \end{pmatrix} \quad (21)$$

If the receiver has $N_r$ antennas, the detection result is the weighted sum of the estimations from different antennas, and the weight is the 2-norm of channel gain.

Although in a $\{1,2\}$ 2 MIMO system, $N_r$ is 1 or 2, the following equation (22) is valid for other MIMO systems where the receivers may have 3 or more antennas:

$$\hat{x} = (\hat{x}_1 \hat{x}_2) = \frac{\sum_{r=1}^{N_r} (\|h_r\|^2 \hat{x}_r)}{\sum_{r=1}^{N_r} \|h_r\|^2} \quad (22)$$

If the receiver can only accommodate low-resolution video (e.g., a 1-antenna receiver), it can take an average of $\hat{x}_1$ and $\hat{x}_2$, and obtain a single estimation for a 2×2 block. Then, power de-scaling and inverse DCT are sequentially applied to obtain a low-resolution video frame. If the receiver can accommodate high-resolution video (e.g., a 2-antenna receiver), it obtains $x_1 = x_1' = \hat{x}_1$ and $x_2 = x_2' = \hat{x}_2$. The four low-resolution sequences $S_{11}$, $S_{12}'$, $S_{21}'$ and $S_{22}'$ are recovered through power de-scaling and inverse DCT. Then, inverse pixel-shift predictions (e.g., inverse of equation (15)) are performed to get $S_{12} = P_\rightarrow(S_{12}')$, $S_{21} = P_\downarrow(S_{21}')$ and $S_{22} = P_\searrow(S_{22}')$. Finally, the high-resolution sequence is recovered from these four low-resolution sequences.

Example Multiplexing Mode Detection

In addition to diversity mode, receivers with at least 2 antennas may operate in a multiplexing mode (e.g., spatial multiplexing mode), and use multiplexing mode decoding. A channel model can be denoted as:

$$Y = XH + N \quad (23)$$

In equation (23), $Y = [y_1 y_2]$, $H = [h_1 h_2]$, and N is the noise component. Theoretically, X can be directly decoded using equation (23). However, direct decoding cannot benefit from the inherent similarity assumption that $x_1 \approx x_1'$ and $x_2 \approx x_2'$. Thus, a joint decoding algorithm for multiplexing mode detection is shown below. In particular, the receiver shall first take advantage of the similarity assumption and detect $\hat{x}_1$ and $\hat{x}_2$ in the diversity mode. Then, the following overdetermined set of equations are solved:

$$(y_1^1 y_2^1 y_1^{2*} y_2^{2*} \hat{x}_1 \hat{x}_2) = x' \begin{pmatrix} H & 0 & \frac{1}{2}I \\ 0 & H' & \frac{1}{2}I \end{pmatrix} + N \quad (24)$$

where $x' = (x_1 x_2 x_1' x_2')$, I is a 2×2 identity matrix, and H' is:

$$H' = \begin{pmatrix} h_{21}^* & h_{22}^* \\ -h_{11}^* & -h_{12}^* \end{pmatrix} \quad (25)$$

Note that $y_1^1$, $y_2^1$, $y_1^2$ and $y_2^2$ are the signals received by each of the two antennas in the two time slots. Also, $\hat{x}_1$ and $\hat{x}_2$ are as described above for diversity mode detection.

There are actually 12 real-valued equations in equation (24). Linear least square estimation (LLSE) can be used to decode this equation array by solving equation (24) to yield $x_1$, $x_2$, $x_1'$ and $x_2'$. Both power scaling factor $g_i$ and pairwise scaling factor $\alpha$ are included in the equations for joint decoding to provide for appropriate de-scaling. Once the coefficients are decoded, the process to recover high-resolution video can be the same as the process used in diversity mode decoding. Thus, using M-STBC, a 2-antenna receiver can receive twice the number of coefficients compared to a 1-antenna receiver.

Example Transmitter and Receiver

Figure 4:
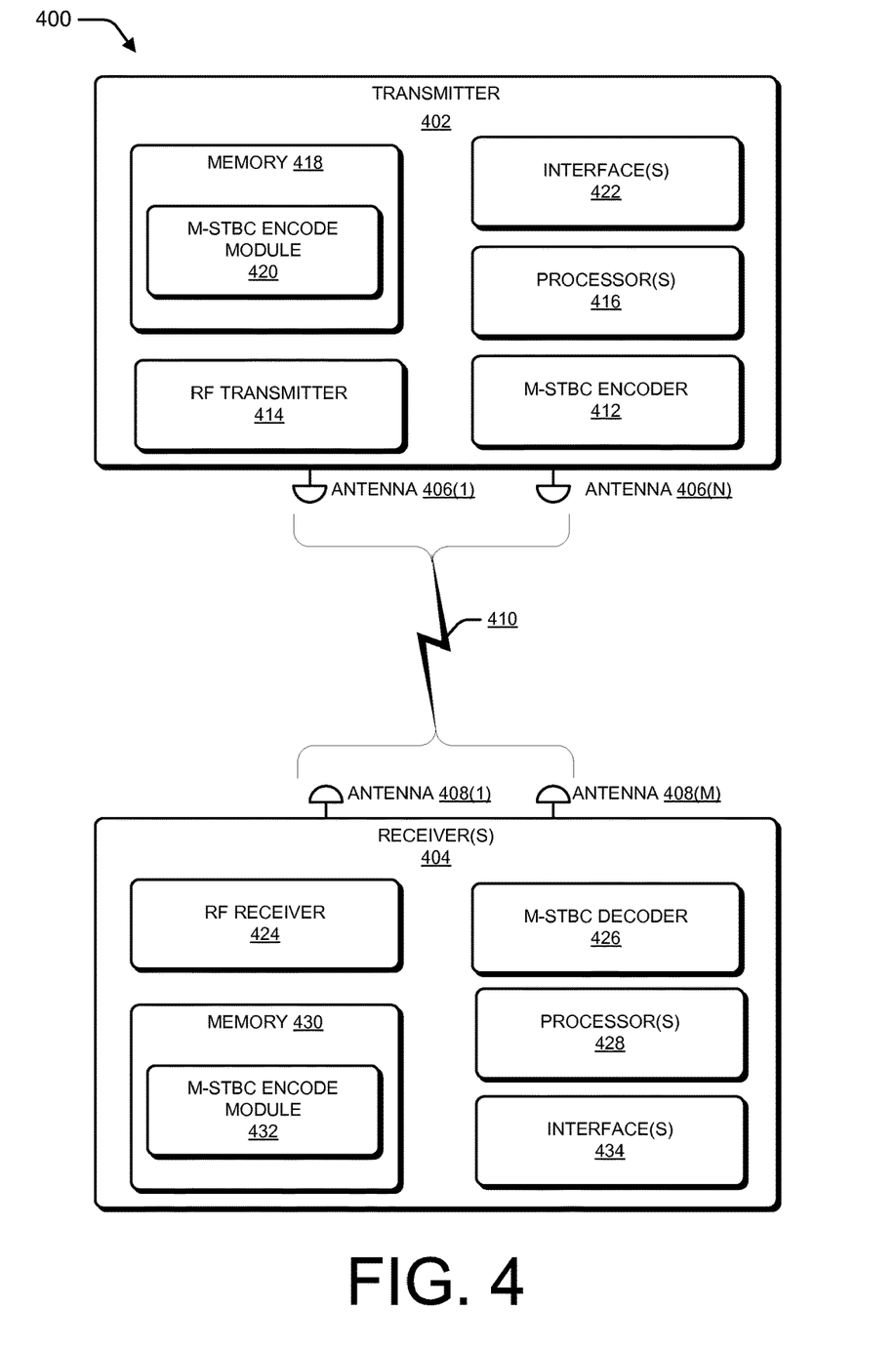
FIG. 4 illustrates an environment of an example transmitter and an example receiver used for M-STBC.

FIG. 4 illustrates an example environment 400 usable to implement M-STBC encoding in transmitter 402, and M-STBC decoding in receiver(s) 404. Transmitter 402 transmits M-STBC encoded data via transmit antennas 406(1) to 406(N), where N≥2, to receive antenna(s) 408(1) to 408(M) over wireless channel 410. Receiver 404 may have a single antenna 408(1), or multiple antennas 408(1) to 408(M), where M≥2. However, for simplicity of discussion, transmitter 402 will be described as having two transmit antennas, 406(1) and 406(2), and receiver(s) 404 having either one antenna 408(1) or two antennas 408(1) and 408(2). As an example, transmitter 402 transmits a video multicast to multiple single and dual antenna receivers 404 in a heterogeneous MIMO environment.

Channel 410 may include a wireless channel (e.g., radio frequency (RF) link, IEEE 802.11x, 4G LTE, etc.). Thus, channel 410 may include a part of a wireless network. Channel 410 may also include a noisy channel, such that signals received by receiver(s) 404 may be corrupted by noise, fading, or other interferences. In various embodiments, receiver(s) 404 have knowledge (e.g., precise knowledge) of fading parameters and coefficients of channel 410.

Transmitter 402 includes an M-STBC encoder 412 for encoding a video stream using the M-STBC encoding techniques as described herein. In various embodiments, M-STBC encoder 412 may include hardware control circuitry, hardware logic, processing units, one or more digital signal processors DSPs, one or more application specific integrated circuits (ASICs), memory, firmware, and/or the like, for performing M-STBC encoding. M-STBC encoder 412 may directly connect to radio frequency (RF) transmitter 414 for modulation and transmission of M-STBC encoded video. Thus, M-STBC encoder 412 can be configured to extract low-resolution sequences from a video sequence, generate predictions of one of the low-resolution sequences using other of the low resolution sequences, divide sequences into GOPs and perform a 3D-DCT on the GOPS, perform power allocation by scaling DCT coefficients, perform directional pairing, pair-wise scaling and provide values as illustrated in equation (19) to RF transmitter 414 for transmission to receiver(s) 404.

Transmitter 402 may also include one or more processors 416. Processors 416 comprise electronic circuitry, hardware logic, processing cores, or the like, for processing executable instructions in internal processor memory (e.g., cache memory) as well as external memory 418. Memory 418 may contain various modules, such as M-STBC encode module 420. M-STBC encode module 420 may contain instructions to facilitate the operation of M-STBC encoder 412. In various embodiments, M-STBC encode module 420 may perform some or all of the operations described for M-STBC encoder 412.

Interfaces 422 may be used to facilitate communications with devices or components embedded with, or external to, transmitter 402, that may include sources of data (e.g., multicast video) to be transmitted.

Receiver 404 includes RF receiver 424 for receiving and demodulating M-STBC encoded data.

When receiver 404 only has a single antenna 408, M-STBC decoder 426 can be configured to perform diversity mode decoding, for example, as described in equation (21). Thus, in various embodiments, M-STBC decoder 426 can be configured to determine an average of $\hat{x}_1$ and $\hat{x}_2$, and obtain a single estimation for a 2×2 block. M-STBC decoder 426 can be further configured to perform power de-scaling and an inverse DCT to obtain a low-resolution video frame.

Conversely, when receiver 404 has multiple antennas (e.g., 2 antennas 408(1) and 408(2)), decoder 426 can be configured to perform both diversity mode decoding, for example, as described in equations (21) or (22), and multiplexing mode decoding, as described in equations (23)-(25) herein. M-STBC decoder 426 can be configured to determine current channel conditions (e.g., SNR levels) and seamlessly switch between diversity mode decoding and multiplexing mode decoding such that received video quality is optimized.

In various embodiments, M-STBC decoder 426 may include hardware circuitry, hardware logic, processing units, one or more digital signal processors DSPs, one or more application specific integrated circuits (ASICs), memory, embedded instructions, and/or the like, as control circuitry for performing M-STBC decoding operations in real time for consumption of video at a highest resolution capable for a device (e.g., devices 104, 106 or 108 in FIG. 1) interfaced to, or integrated with, receiver 404.

Receiver 404 may also include one or more processors 428. Processors 428 may comprise electronic circuitry, hardware logic, processing cores, cache memory, or the like, for processing executable instructions in internal processor memory as well as external memory 430. Memory 430 may contain various modules, such as M-STBC decode module 432. M-STBC decode module 432 may contain instructions, for execution by processor(s) 428, to facilitate the operation of M-STBC decoder 426. In various embodiments, M-STBC decode module 432 may perform some or all of the operations described for M-STBC decoder 426. Interfaces 434 may be used to facilitate communications with display(s), devices or components embedded with, or external to, receiver 404.

Receiver(s) 404, as well as transmitter 402 may include and/or interface with, computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory, cache memory or other memory in RPC-BP decoder 622, or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Methods

Figure 5:
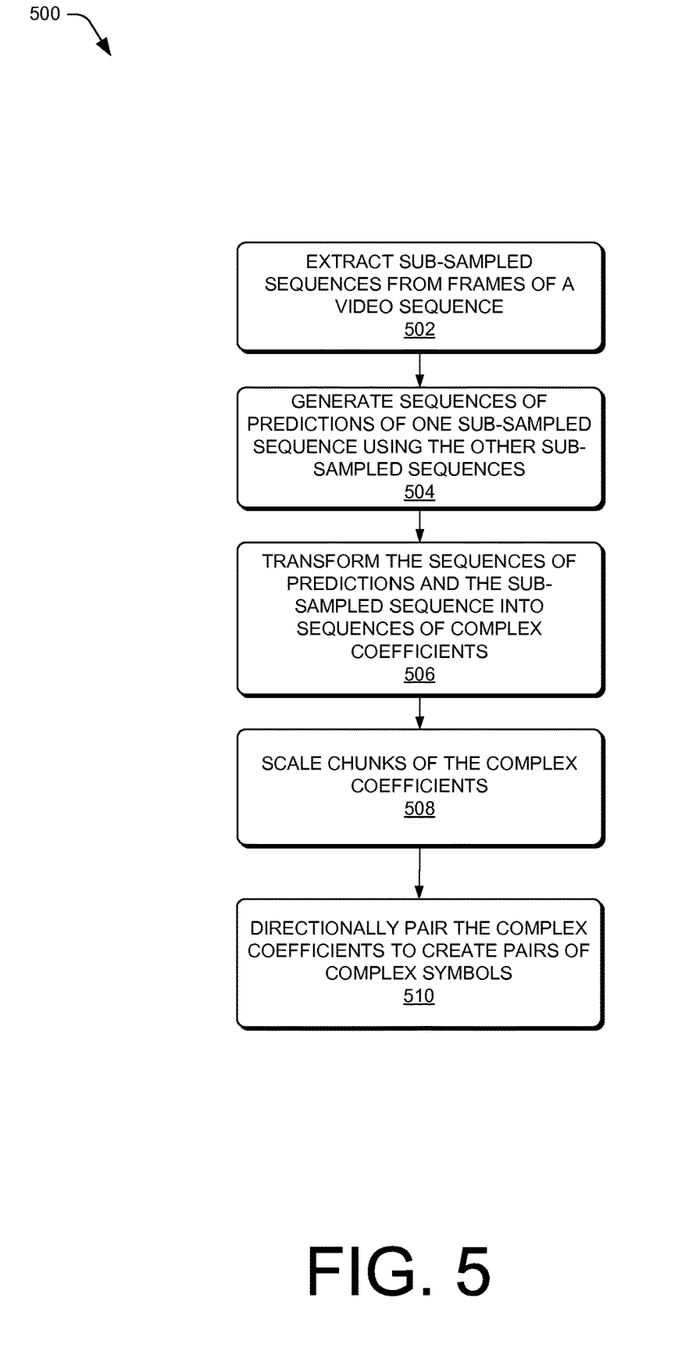
FIG. 5 is a flowchart of an example method of performing M-STBC.

FIG. 5 is a flow diagram of an example process 500 performed at a transmitter, such as transmitter 402. This process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. In the context of hardware, the blocks represent operations performed by control circuitry with or without the assistance of firmware or software. Note that the order in which the process is described is not a limitation, and any number of the described process blocks can be combined in any order to implement the process, or alternate processes. Additionally, individual blocks may be deleted from the processes without departing from the spirit and scope of the subject matter described herein. Furthermore, while this process is described with reference to the transmitter 402 of FIG. 4, other hardware and/or software architectures may implement one or more portions of this process, in whole or in part.

At block 502, sub-sampled sequences are extracted from multiple frames of a video sequence. As an example, transmitter obtains a video stream from memory 418 and/or interfaces 422 and divides each frame in the video sequence into 2×2 blocks, and assigns each pixel in a block to a different sequence $S_{11}$, $S_{12}$, $S_{21}$ and $S_{22}$, as illustrated at 304 in FIG. 3.

At block 504, sequences of predictions of a first (e.g., one of) of the sub-sampled sequences are generated using other of the sub-sampled sequences. As an example, M-STBC encoder and/or M-STBC encode module 420 generate the four sequences $S_{11}$, $S_{12}'$, $S_{21}'$ and $S_{22}'$, as described herein, however, this is not a limitation, as other combinations are within the scope of this disclosure. As an example, sequences of predictions can be performed for any of $S_{11}$, $S_{12}$, $S_{21}$, or $S_{22}$ using other of the sub-sampled sequences (e.g., sequence $S_{12}$ may be predicted using $S_{11}'$, $S_{21}'$ and $S_{22}'$, etc.). As an alternate example, a sequence can be predicted that is a sequence other than the original sequences $S_{11}$, $S_{12}$, $S_{21}$, or $S_{22}$ (e.g., all four sub-sampled sequences can be used to predict pixel values at position (1.5, 1.5) as a half pixel position sequence).

At block 506, the sequences of predictions and the first of the sub-sampled sequences are transformed into corresponding sequences of complex coefficients. As an example, at 306 of FIG. 3, a 3D-DCT is performed on a GOP to generate corresponding sequences of complex coefficients associated with the four sequences $S_{11}$, $S_{12}'$, $S_{21}'$ and $S_{22}'$.

At block 508, chunks of the complex coefficients are scaled. As an example, at 306 in FIG. 3, DCT coefficients associated with frames associated with $S_{11}$, $S_{12}'$, $S_{21}'$ and $S_{22}'$ are divided up into a plurality of sub-portions (e.g., 64 chunks per frame), and a scaling factor is determined for each chunk based at least in part on an average variance in each chunk to generate the four sequences at 308. Thus, each chunk is associated with a sub-divided portion of a frame of the multiple frames of the video sequence. The chunks of the complex coefficients are at similar locations in each of the sequences of complex coefficients (i.e., transformations of sequences $S_{11}$, $S_{12}'$, $S_{21}'$ and $S_{22}'$). The scaling may act to more uniformly distribute complex values in each sequence. Thus, for each chunk, the complex coefficients in each of the sequences of complex coefficients are scaled by a scale factor that is common to the chunk, such that the scale factor is based on an average variance of complex coefficients in the chunk averaged over the sequences of complex coefficients.

At block 510, complex coefficients are directionally paired to create pairs of complex symbols, wherein the directionally pairing the complex coefficients creates the pairs of complex symbols based on a direction across a block that includes the complex coefficients. As an example, M-STBC encoder and/or M-STBC encode module 420 can evaluate a block of the scaled coefficients (e.g., an 8×8 block) and determine which of a horizontal, vertical or diagonal pairing would create more similar values of, for example, $x_1$ and $x_1'$. Once the direction is determined, an appropriate set of equations are selected from equation (13) for processing. Pair-wise scaling may be performed on the pairs of complex symbols to, for example, further increase the similarity between $x_1$ and $x_1'$ (i.e., the estimate of $x_1$) and provide a balance between detection in a spatial multiplexing mode and a diversity mode. As an example, a first pair-wise scaled complex symbol in one of the pairs is transmitted in a first time slot via a first transmit antenna, and a second pair-wise scaled complex symbol in the one of the pairs is transmitted in a second time slot via a second transmit antenna. Streams of the complex symbols represent the multiple frames of the video sequence. The complex symbols are generated as a part of a multiplexed space-time block coding (M-STBC), wherein a signal encoded using M-STBC and transmitted by a multi-antenna transmitter includes both a spatial multiplexing mode and a diversity mode.

As an example, a signal encoded using M-STBC and transmitted by a multi-antenna transmitter includes four or more different complex symbols in two time slots, as shown in equations (5) and (19). In contrast, Alamouti's code designed for a two-transmit antenna system only transmits two complex symbols in two time slots, as shown in equation (3).

Therefore, using the techniques described herein, a receiver having multiple antennas can receive the signal having four or more different complex symbols in two time slots, and use a decoder to decode the signal in a spatial multiplexing mode and a diversity mode, select either the spatial multiplexing mode or the diversity mode (e.g., based on channel conditions) and decode the signal in the selected mode. Moreover, the decoder can be configured to seamlessly switch between decoding the signal in the spatial multiplexing mode or the diversity mode. As for a single antenna receiver, it can be configured to decode the signal in the diversity mode.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:
1. A method, comprising:
extracting sub-sampled sequences from multiple frames of a video sequence;
generating sequences of predictions of one of the sub-sampled sequences using other of the sub-sampled sequences;
transforming the sequences of predictions and the one of the sub-sampled sequences into corresponding sequences of complex coefficients;
scaling chunks of the complex coefficients; and
directionally pairing the complex coefficients to create N pairs of complex symbols that are transmitted in M different time slots and in which N is greater than M, wherein the N pairs of complex symbols are generated as a part of a multiplexed space-time block coding (M-STBC), and wherein a signal encoded using M-STBC code that is transmitted by a multi-antenna transmitter is decodable using the M-STBC code according to both a multiplexing mode and a diversity mode.

2. The method as recited in claim 1, wherein each of the pairs of complex symbols includes a complex symbol and an estimate of the complex symbol.

3. The method as recited in claim 1, wherein the chunks of the complex coefficients are at corresponding locations in each of the sequences of complex coefficients.

4. The method as recited in claim 3, wherein for each chunk, the complex coefficients in each of the sequences of complex coefficients are scaled by a scale factor that is common to the chunk.

5. The method as recited in claim 4, wherein the scale factor is based on an average variance of complex coefficients in the chunk averaged over the sequences of complex coefficients.

6. The method as recited in claim 1, wherein each chunk is associated with a sub-divided portion of a frame of the multiple frames of the video sequence.

7. The method as recited in claim 1, wherein the complex symbols represent the multiple frames of the video sequence.

8. The method as recited in claim 1, further comprising pair-wise scaling the complex symbols in the pairs.

9. The method as recited in claim 8, further comprising transmitting a first pair-wise scaled complex symbol in one of the pairs in a first time slot via a first transmit antenna, and transmitting a second pair-wise scaled complex symbol in the one of the pairs in a second time slot via a second transmit antenna.

10. The method as recited in claim 1, wherein directionally pairing the complex coefficients creates the pairs of complex symbols based on a direction across a block that includes the complex coefficients.

11. The method as recited in claim 10, wherein the direction that is selected increases a correspondence of the complex symbols in the pairs.

12. A system, comprising:
an encoder configured to:
extract sub-sampled sequences from multiple frames of a video sequence;
generate sequences of predictions of one of the sub-sampled sequences using other of the sub-sampled sequences;
transform the sequences of predictions and the one of the sub-sampled sequences into corresponding sequences of complex coefficients for generation of complex symbols; and
directionally pair the complex symbols in N pairs of complex symbols; and a transmitter having a first antenna and a second antenna, the transmitter configured to:
    transmit a signal including the N pairs of complex symbols via the first antenna and the second antenna in M different time slots in which N is greater than M, wherein the signal is encoded using a multiplexed space-time block coding (M-STBC) code, and
    wherein the signal is decodable using the M-STBC code according to both a spatial multiplexing mode and a diversity mode.

13. The system as recited in claim 12, the encoder further configured to scale chunks of the complex coefficients to create scaled complex coefficients.

14. The system as recited in claim 12, wherein the sequences of predictions are generated horizontally, vertically and diagonally using the other of the subsampled sequences.

15. A method, comprising:
    extracting sub-sampled sequences from multiple frames of a video sequence;
    generating sequences of predictions of one of the sub-sampled sequences using other of the sub-sampled sequences;
    transforming the sequences of predictions and the one of the sub-sampled sequences into corresponding sequences of complex coefficients;
    determining a direction to directionally pair the complex coefficients based, at least in part, on a spatial correlation of the complex coefficients;
    directionally pairing the complex coefficients to create N pairs of complex symbols; and
    transmitting, via a multi-antenna transmitter, a signal that includes the N pairs of complex symbols in M different time slots, wherein N is greater than M, and wherein the signal is encoded using a multiplexed space-time block coding (M-STBC) code such that the signal is decodable using either one of a spatial multiplexing mode and a diversity mode.

16. The method as recited in claim 15, further comprising decoding the signal using the M-STBC code in diversity mode when it is determined that a signal-to-noise ratio is less than a predetermined level.

17. The method as recited in claim 15, further comprising decoding the signal using the M-STBC code in multiplexing mode when it is determined a signal-to-noise ratio is greater than a predetermined level.

18. The method as recited in claim 1, further comprising decoding the signal in a first mode based, at least in part, on a first signal-to-noise ratio (SNR) level, the first mode decoding being one of the multiplexing mode or the diversity mode.

19. The method as recited in claim 18, further comprising changing the decoding the signal to a second mode that is different from the first mode in response to a change from a change from the first SNR level to a second SNR level, the second mode being one of the multiplexing mode or the diversity mode.

20. The method as recited in claim 15, further comprising scaling chunks of the complex coefficients.

* * * * *